(12) United States Patent
Lesartre et al.

(10) Patent No.: US 7,727,352 B2
(45) Date of Patent: Jun. 1, 2010

(54) METHOD OF PRODUCING A POLARIZING OPTICAL ELEMENT

(75) Inventors: Noemie Lesartre, Charenton-le-Pont (FR); Dominique Rychel, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 351 days.

(21) Appl. No.: 11/677,668

(22) Filed: Feb. 22, 2007

(65) Prior Publication Data

US 2008/0044610 A1 Feb. 21, 2008

(30) Foreign Application Priority Data

Feb. 23, 2006 (FR) .................................. 06 01611

(51) Int. Cl.
- B29C 65/48 (2006.01)
- B29C 65/56 (2006.01)
- B32B 37/14 (2006.01)
- C09J 5/04 (2006.01)
- B23K 37/04 (2006.01)
- B29C 65/02 (2006.01)
- B32B 37/06 (2006.01)
- B32B 38/18 (2006.01)

(52) U.S. Cl. ..................... 156/295; 156/228; 156/285; 156/312; 156/323; 156/580; 156/581

(58) Field of Classification Search ................. 156/228, 156/244.27, 285, 295, 312, 323, 580, 581
See application file for complete search history.

(56) References Cited

U.S. PATENT DOCUMENTS

| | | | | |
|---|---|---|---|---|
| 4,061,518 A * | 12/1977 | Burroughs et al. | .......... | 156/232 |
| 5,645,767 A * | 7/1997 | Van Gemert | ................ | 252/586 |
| 5,858,163 A * | 1/1999 | Wood et al. | ................. | 156/350 |
| 6,562,466 B2 | 5/2003 | Jiang et al. | | |
| 2003/0017340 A1* | 1/2003 | Jiang et al. | .................. | 428/412 |
| 2004/0065968 A1* | 4/2004 | Klemm et al. | ............... | 264/2.5 |
| 2006/0275627 A1* | 12/2006 | Biteau et al. | ................ | 428/817 |
| 2007/0034322 A1* | 2/2007 | Glacet et al. | ................ | 156/230 |
| 2007/0126983 A1* | 6/2007 | Godeau et al. | .............. | 351/163 |

FOREIGN PATENT DOCUMENTS

| | | | |
|---|---|---|---|
| EP | 1256602 A1 * | 11/2002 | |
| EP | 1426168 | 9/2004 | |
| EP | 1593990 | 9/2005 | |
| JP | 2002196141 A * | 7/2002 | |
| JP | 2002196141 | 10/2002 | |
| WO | WO 8602038 A * | 4/1986 | |
| WO | WO 9308489 A1 * | 4/1993 | |
| WO | WO93 08489 A * | 9/1993 | |
| WO | WO9735216 | 9/1997 | |

* cited by examiner

Primary Examiner—Philip C Tucker
Assistant Examiner—Sonya Mazumdar
(74) Attorney, Agent, or Firm—Occhiuti Roblicek & Tsao LLP (57) ABSTRACT

A polarizing optical element is produced by firstly forming a polarizing multilayer structure (30) on a support (31). The structure comprises an orienting layer and a polarizing layer having dichroic compounds, the dichroic compounds being oriented by the orienting layer. The multilayer structure is then pressed against one surface of the optical element (40) through the support, with a portion of adhesive placed between the structure and the optical element. The support (31) for the structure is then removed, leaving the structure (30) bonded to the optical element (40).

19 Claims, 4 Drawing Sheets

METHOD OF PRODUCING A POLARIZING OPTICAL ELEMENT

This application claims priority to French Application Serial No. 0601611, filed on Feb. 23, 2006, the contents of which are hereby incorporated by reference in its entirety.

FIELD OF THE INVENTION

The present invention relates to a method of producing a polarizing optical element and to an optical element obtained by this method. It also relates to a multilayer structure useful for producing such a polarizing optical element.

BACKGROUND OF THE INVENTION

It is known to provide an optical element with a polarizing function by successively producing, on one surface of this element, an orienting first layer and a polarizing second layer comprising dichroic compounds. The dichroic compounds of the second layer have an angular orientation determined by the first layer. Such a method makes it possible to obtain an optical element having a high transmission contrast for polarized light. As is known, such a contrast is defined as the ratio of the transmission coefficient for light polarized parallel to the direction of the dichroic compounds to the transmission coefficient for light polarized perpendicular to this direction. Furthermore, the optical quality and the optical appearance of the polarizing optical element obtained in this way are satisfactory and compatible with many uses, especially ophthalmic use.

SUMMARY OF THE INVENTION

One object of the present invention is to propose an alternative method of producing a polarizing optical element, making it possible in the production line to separate the production of the optical element from the providing of its polarizing function. Such a method is particularly advantageous for producing an optical element such as an ophthalmic lens in a prescription laboratory. To do this, the invention provides a method of producing a polarizing optical element by applying a multilayer structure onto a surface of a base optical element. The structure comprises an orientating first layer consisting of a network of photooriented polymers and a polarizing second layer comprising liquid-crystal monomers and at least one dichroic dye, said liquid crystals having an angular orientation determined by the first layer. The method comprises the following steps:

a) producing the multilayer structure on a support;
b) placing the base optical element and the multilayer structure carried by the support between a first pressing device having a bearing surface and a second pressing device having an inflatable membrane, the multilayer structure facing the base optical element and a portion of an adhesive being placed between said structure and said base element;
c) pressing the multilayer structure against the surface of the base optical element by inflating the membrane and maintaining a fixed gas between the first and second pressing devices; and
d) releasing the optical element and removing the support so as to leave the multilayer structure bonded to the surface of the base optical element.

Thus, the multilayer structure, which provides the optical element with its polarizing function, is firstly produced on a support, and then applied onto the base optical element by exerting pressure through the support. The multilayer structure is thus bonded to the base optical element, by means of the adhesive portion, and the support can be removed, for example by peeling it off. The support is useful for producing the multilayer structure in step a) and for introducing the multilayer structure between the pressing devices in step b).

A first advantage of a method according to the invention lies in the possibility of producing a polarizing optical element of small thickness. This is because, unlike casting methods commonly used in the field of ophthalmics for producing thermoset polarizing lens, it is unnecessary to sandwich a polarizing film between two polymer layers constituting of the lens. In addition, such a method does not require a heating step, thus making it possible to preserve:

on the one hand, the dioptric properties of the optical element; and
on the other hand, the colorimetric and polarizing properties of the multilayer structure that imparts the polarizing functionalization.

A second advantage of a method according to the invention lies in the fact that the multilayer structure can be applied onto the base optical element downstream of an optical element distribution network, or at the very least outside of centralized production plants. This is because the multilayer structure carried by the support can be supplied independently of the base optical element and can be applied onto the latter in a customer centre, or in an intermediate laboratory between such a centre and a production plant, since steps b) to d) are relatively rapid and require no very expensive equipment. The polarizing optical element may then be produced on demand, without incurring long manufacturing lead times. Such an advantage may be particularly important when the optical element is an ophthalmic lens, taking into account the structure of the plants for manufacturing such lenses and the structure of the distribution network.

A third advantage of the invention results from the use of a portion of an adhesive placed between the multilayer structure and the base optical element. A method according to the invention can then be used for base optical elements that have different chemical compositions, at the surface onto which the multilayer structure is applied. The adhesive portion may be initially placed on the surface of the base optical element, but preferably it is placed on the multilayer structure in the form of a layer lying on the opposite side of the first and second layers from the support. When it is initially placed on the multilayer structure, the structure provided with the adhesive layer contains all the elements needed to provide any optical element with a polarizing function. It is therefore sufficient to supply the multilayer structure in order to produce a polarizing optical element from a simple base optical element.

In step b), the base optical element may be placed on the first pressing device side. The multilayer structure is then placed on the second pressing device side. Such an arrangement is advantageous when the membrane of the second device is more capable to deform, by conforming to the shape of the surface of the base optical element onto which the multilayer structure is transferred, than the bearing surface of the first device.

Optionally, the first pressing device having the bearing surface may include another inflatable membrane that forms the bearing surface. Step c) is then carried out by inflating the membranes of both the first and second pressing devices.

Preferably, the polarizing second layer of the multilayer structure is undercured during steps b) and c). The undercuring of this second layer should be understood to mean that it undergoes partial polymerization so that it still contains polymerization functional groups that have not reacted by the end of the partial curing. Such a state of undercure of the polarizing second layer during steps b) and c) has the following advantages:

- this polarizing second layer, and consequently the entire multilayer structure, is then resilient and more plastic during step c). The multilayer structure can then deform more easily during this step, especially so as to acquire a curvature identical to that of the surface of the base optical element, without producing localized stretching, and neither tearing nor forming wrinkles;
- identical undercured multilayer structures can be applied to base optical elements having surfaces with different, either greater or lesser, curvatures. A degree of polymerization of the polarizing second layer that is sufficiently low makes the multilayer structure compatible with different curvatures of the base optical element. The same multilayer structure, produced in large quantity, can therefore be used with variable base optical elements, while still employing the method of the invention downstream of the optical element distribution network; and
- some of the polymerization functional groups of the polarizing second layer that have not yet reacted can help to hold the multilayer structure against the surface of the base optical element. The cohesion of the final optical element can thus be increased.

When the polarizing second layer is undercured during step c), the method may furthermore include a step of supplementarily curing the polarizing second layer, which is carried out after step c). This supplementary curing step provides the polarizing second layer with its final properties, especially its hardness.

According to a preferred embodiment of the invention, this may be carried out by performing the following substeps;

a1) forming a first layer comprising photo-orientable polymers having photoreactive formed on the temporary support;

a2) curing the first layer using linearly polarized ultraviolet radiation so as to produce a network of polymers photooriented along a direction imposed by the direction of polarization of said incident UV radiation;

a3) forming a second layer, comprising a mixture of at least one dichroic dye and at least one crosslinkable monomeric liquid crystal, on the first layer, said dye and said liquid crystal both being angularly oriented by the first layer; and a4) curing the monomeric liquid crystals of the second layer at least partly so as to fix the dichroic dyes in the angular orientation determined by the first layer.

The UV radiation is linearly polarized by means of a polarizer inserted between the UV source and the first layer.

The reaction under polarized light (substep a2) of the photoreactive groups carried by the photoorientable polymer results in the formation of an anisotropic polymer network oriented along the direction of the polarizer. The second layer of the polarizing system, comprising the monomeric liquid crystals and the dichroic dyes, adopt, during sub-step a3), an orientation perpendicular to this direction of the polarizer impressed in the photoorientable polymer. This orientation of the dichroic dyes thus gives to the system its visible light polarization properties. The curing of the monomeric liquid crystals, in substep a4) and optionally during a supplementary curing step carried out after step c), then definitively stabilizes the configuration of the second layer.

Such a method allows the multilayer structure to be obtained with a satisfactory optical quality, which is compatible with many uses, especially ophthalmic uses. This is because, given that the orientation of the dichroic compounds is defined by the direction of polarization of the light used to cure the first layer, no stretching of the layers is required. Any optical defect usually induced by such stretching is therefore eliminated.

The invention also proposes a multilayer structure suitable for being used in a method as described above. Such a structure comprises:

- an orienting first layer that comprises a network of photo-oriented polymer; and
- a polarizing second layer that comprises at least one dichroic dye and a matrix of at least one crosslinkable monomeric liquid crystal suitable for fixing an angular orientation of the dichroic dyes.

The dichroic dyes have an angular orientation that is determined by the first layer so as to produce a polarizing effect on light transmitted through the structure. Furthermore, the multilayer structure is placed on a removable support, that is to say one that it can easily be separated therefrom, for example by peeling.

Examples of photoorientable reactive polymers that can be used within the context of the invention may include those formed from acrylic polymers, methacrylic polymers, polyimides and dendrimers. Photoorientable reactive polymers having photoreactive groups, such as cinnamic acid and its derivatives, chalcones, coumarins or methacrylate bridges, may be particularly envisaged.

Examples of dichroic dyes that can be used within the context of the invention may include azomethines, indigoids, thioindigoids, indans, quinophthalonics, perylenes, phthaloperines, triphenodioxazines, indoloquinoxalines, imidazotriazines, azo and polyazo dyes, benzoquinones, naphthoquinones, anthraquinones and (poly)anthraquinones, anthrapyrimidinones, iodines and iodates. Advantageously, azo dyes and anthraquinones are used within the context of the invention.

Advantageously, the polarizing second layer may be undercured in the multilayer structure that is available according to the invention.

The multilayer structure may further include a layer of an adhesive, which is located on the opposite side of the first and second layers from the support. It may then also include a removable film placed on the adhesive layer. Such a film is intended to be removed before the multilayer structure is pressed against the base optical element. In this way, the adhesive is protected, and then uncovered before the structure is bonded to the base optical element.

Among adhesives that can be used within the context of the invention, mention may be made by way of non-limiting example of: epoxy adhesives; reactive polyurethane adhesives; thermosetting adhesives; adhesives based on curable monomers, such as cyanoacrylate adhesives; structural acrylic or modified acrylic adhesives; hot-melt adhesives; PVC (polyvinyl) plastisols; elastomeric adhesives, neoprene contact adhesives; vinyl emulsion adhesives and copolymers; pressure-sensitive adhesives (PSAs); water-based adhesives.

The multilayer structure may furthermore include at least one other functional layer, intended to provide the optical element with an additional function. In this case, the additional function is provided to the optical element at the same time as the polarizing function, during steps b) to d).

Finally, the invention proposes a polarizing optical element that comprises a base optical element and a multilayer structure as described above. This multilayer structure is fixed onto the base optical element via a layer of an adhesive placed between the base element and the multilayer structure. It provides the optical element with a polarizing function for a light transmitted through this element.

Other features and advantages of the present invention will become apparent in the following description of non-limiting exemplary embodiments, with reference to the appended drawings.

BRIEF DESCRIPTION OF DRAWINGS

FIGS. 3a-3f illustrate various steps of a method according to the invention.

For the sake of clarity of the figures, the dimensions of the elements shown are not in proportion with actual dimensions or ratios of dimensions. Furthermore, identical references in different figures denote identical elements or those having identical functions.

DETAILED DESCRIPTION

Figure 1A:
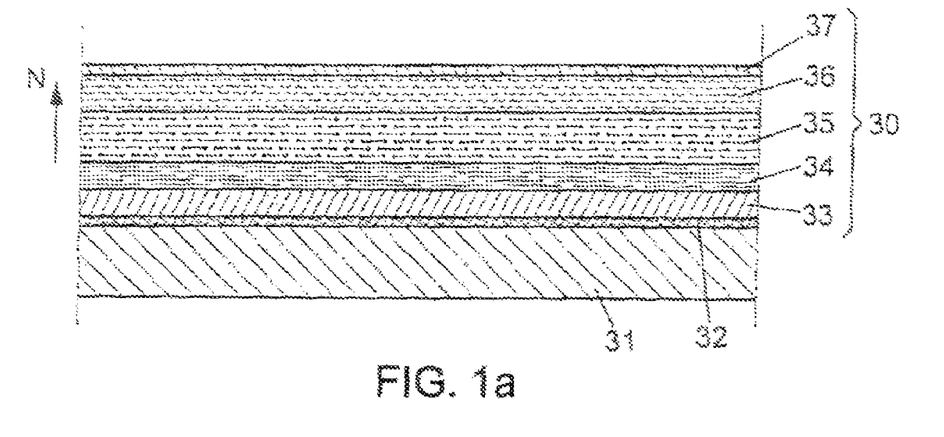
FIGS. 1a and 1b are respective sectional views of a multi-layer structure and of an optical element used to implement a method according to the invention.

According to FIG. 1a, a multilayer structure 30 is carried by a film support 31, which may be polycarbonate-based and may have a thickness between 0.2 and 5.0 mm (millimeters), preferably between 0.5 and 2.0 mm. Advantageously, the support 31 is flexible and has quite a low surface energy, so that the multilayer structure 30 can be easily separated from the support 31, for example by peeling. Optionally, an intermediate layer 32 is placed between the support 31 and the structure 30 so as to make it easier to separate them. Such an intermediate layer 32 is called a peeling layer and may comprise, in particular, a silicone-based surfactant compound.

In the method of implementing the invention described here, the multilayer structure 30 comprises five individual layers, referenced 33 to 37. However, it should be understood that it may also include additional layers, which are then transferred onto the base optical element within the structure 30.

The layer 33, which is formed first on the support 31 or on top of the peeling layer 32, is intended to provide a specific function to the optical element onto which the structure 30 will be transferred. This may be, for example, a UV radiation protective layer, an oxygen barrier layer, an abrasion-resistant layer, an impact-resistant layer, an antireflecting coating, an antistatic coating or an antisoiling coating. Each of these coatings is supposed to be known individually, as well as at least one method for manufacturing this one on the support 31. The layer 33 then makes up part of the structure 30 that is intended to be separated from the support 31. Possibly, the layer 33 may be a combination of several of the preceding layers or coatings. A combination which is especially preferred is composed of the following stack: an hydrophobic or oleophobic coating, an antireflecting coating, and antiabrasion coating and then an impact-resistant coating.

The layer 34, which is situated on the layer 33 within the structure 30, is formed from an anisotropic polymer network that induces an orientation of the compounds of the layer 35. The dichroic dyes that are incorporated into the layer 35 thus have an orientation that is determined by the layer 34. It results in a macroscopic polarizing effect of the structure 30, for a light beam that passes through it. In a known manner, the polarizing effect of the structure 30 is even greater when the distribution of the angular orientations of the dichroic dyes in the layer 35 is tight around the direction determined by the layer 34.

The layer 34 comprises photoorientable polymers having photoreactive groups, which, after reacting under linearly polarized light, form an anistropic polymer network that is oriented along the direction of the polarizer. For example, the layer 34 is formed on the support 31, already provided with layers 32 and 33, from polymers bearing cinnamic acid photoreactive groups. This polymer is dissolved, for example, in a methyl ethyl ketone or cyclohexanone solvent or in a mixture of these latter two solvents. The surface energy of the material, on which the layer 34 is formed, is adjusted so as to obtain a continuous layer 34 of regular thickness. The solvent is then evaporated, for example using infrared radiation or by passing into an oven, and the layer 34 is cured under the effect of a UV-B type radiation. To cause cure of the layer 34 into the form of a photooriented polymer network, the UV-B radiation that is used is linearly polarized by using a polarizer. This radiation may have an energy that is between 5 and 300 mJ/cm$^2$ (millijoules per centimeter squared), for example.

The layer 35 is then formed on the layer 34 from a mixture of crosslinkable liquid crystal monomers and dichroic dyes distributed in a solvent. Possibly, the dichroic dyes may be chosen to give a color to the structure and subsequently, to give the final optical element an anti-solar filter function. The liquid crystal monomers and dichroic dyes of the layer 35 on the layer 34 may be mixed with a solvent such as cyclohexanone for example. The layer 35 is heated then cured under the effect of UV-A radiation. During the heating, the liquid crystal monomers adopt an orientation that is determined by the orientation of the photooriented polymer network of the layer 34 and that is perpendicular to this. The heating temperature may, for example, be 87° C. Naturally, the heating and drying step may be carried out within the same step of the overall method. The heating temperature will depend strongly on the type of liquid crystals used. During this step, the clarification temperature of the liquid crystals should not be exceeded. Above this temperature, the liquid crystals are no longer oriented along a preferential direction.

The thickness of the layer 34 may be between 50 and 200 nm (nanometers), and is preferentially equal to around 140 nm. The thickness of the layer 35 may be between 3 and 100 μm (micrometers), preferentially between 5 and 50 μm, and advantageously between 5 and 10 μm. Under these conditions, the radiation energy for curing the layer 35 is preferably between 0.3 and 1.5 J (joules), even between 0.35 and 0.8 J, in order to completely cure this layer. For the layer 35 to be partially cured, the energy of the radiation used may be reduced no a fraction of the above values.

The layers 34 and 35 may be formed on the support 31 by spin-coating or spray-coating, when the dimensions of the support 31 are compatible with the uniform spreading of the liquids used in these methods.

The structure 30 may also comprise a layer of an adhesive 36. This may be an epoxy-based layer, a latex-based layer, especially a polyurethane-based layer, or a layer made from a pressure-sensitive adhesive. It preferably has a constant thickness, in order not to subsequently modify the optical power of the optical element.

Optionally, the layer of adhesive 36 may be covered by a film or liner 37, intended to be removed so as to uncover the adhesive surface of the layer 36 before the structure 30 is applied onto the optical element.

The layer 36 and the film 37 may also be formed by spin-coating on the layers 33-35 carried by the support 31. Their formation is therefore considered to be known by those skilled in the art, and will not be discussed further in detail here. Such a spin-coating process is particularly suitable for the layer 36, as it produces a layer of adhesive whose thickness is constant over the entire structure 30. The layer 36 therefore in no way impairs the dioptric behaviour of the polarizing optical element that is finally obtained according to the invention—the final polarizing lens, provided with the structure 30, has an optical power distribution that is identical to that of the initial lens 40.

Figure 1B:
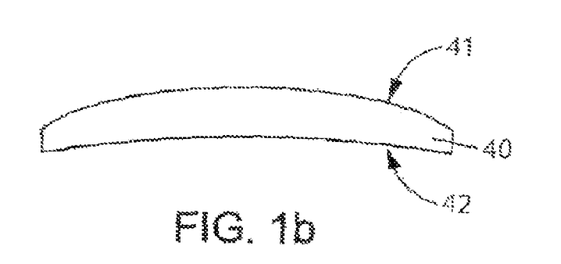

The layer 36 may also be deposited directly on the face 41 of the lens 40.

Also indicated in FIG. 1a is a direction N for defining the orientation of the structure 30. The direction N is perpendicular to the layers of the structure 30, starting from the support 31.

As an illustration the invention will be described within the context of applying the above multilayer structure onto an ophthalmic lens that constitutes the base optical element. Of course, it may be employed in a similar manner to other optical elements, such as for example a sighting instrument element, a measurement instrument element, a helmet visor, etc.

According to FIG. 1b, an ophthalmic lens 40 has a convex anterior surface 41 and a concave posterior surface 42. It may be made of a mineral or organic material, in particular an organic material having a high refractive index. Within the context of the invention, the expression "high refractive index" is understood to mean an index of 1.60 or higher, possibly equal to 1.67 for example. The use of such a high-refractive-index material for producing a lens for ametropia correction is particularly advantageous, since, for the same optical power, the lens then is thinner and of lower curvature. This results in a lens of lower weight, providing the wearer with greater comfort. In particular, such an ophthalmic lens may have a thickness of less than 1.2 mm in a central zone of the lens, or even substantially equal to 1.1 mm.

The invention will now be described within the context of applying the multilayer structure 30 onto the convex face 41 of the lens 40. However, it should be understood that the method may be employed in a similar manner for applying the structure 30 to the concave face of a base optical element, for example the face 42 of the lens 40.

Preferably, the support 31 has a shape substantially complementary to the surface 41 of the lens 40, when the support and the lens are placed so as to be pressed against each other. Pressing the structure 30 against the lens 40 then creates less stress in the layers of the structure, and the lens finally obtained has fewer visible defects, such as stretch marks, wrinkles or tears of at least one of the layers 33-37. The support 31 may initially have such a shape, that is to say before the structure 30 is produced. Alternatively, the structure 30 may be produced on the support 31 while it is flat. In this case, the support 31 provided with the structure 30 may be preformed before the structure is pressed against the lens 40.

Figure 2A:
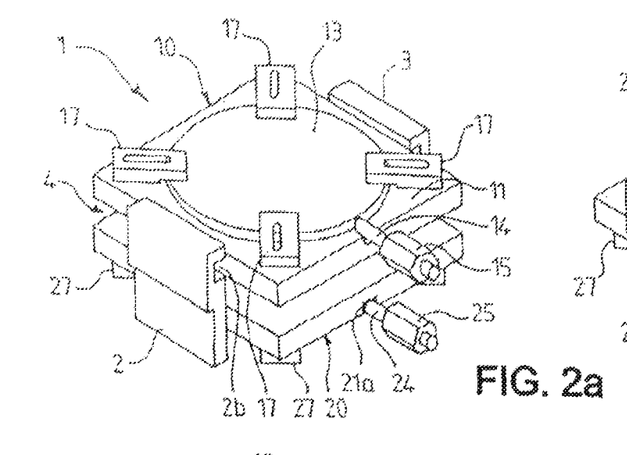
FIGS. 2a-2c and 3a are perspective and sectional views of pressing devices that can be used to implement a method according to the invention.
Figure 2B:
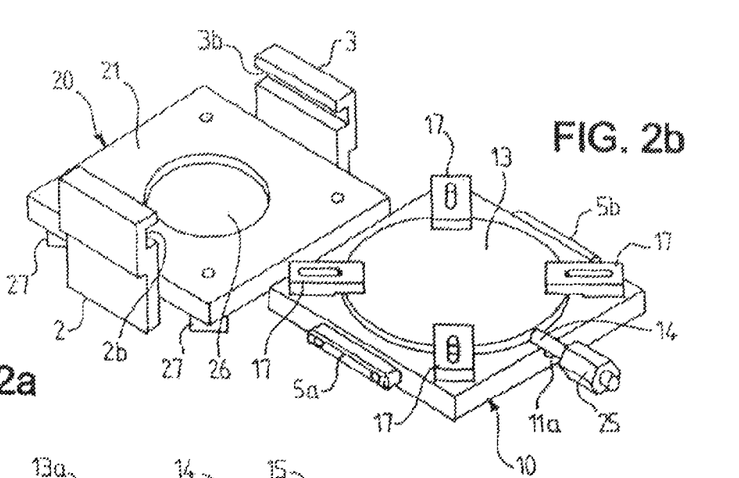

According to FIG. 2a, a pressing system 1 having two inflatable membranes comprises a first pressing device and a second pressing device, referenced 10 and 20 respectively. FIG. 2b shows these two devices in a separated configuration.

The two devices 10 and 20 may be joined together with a predetermined gap 4 (FIG. 2c) between them, by means of two lateral flanges 2 and 3. The flanges 2 and 3 may be integral with the device 20 and provided with grooves 2b and 3b. The device 10 is then provided with lateral rails 5a and 5b so as to allow the devices 10 and 20 to be simply joined together by sliding the rails 5a and 5b into the grooves 2b and 3b, which form slideways.

In the embodiment of the invention described now, each device 10 (or 20) comprises a main body 11 (or 21) provided with an opening 12 (or 22). The opening is slightly larger than the sire of an ophthalmic lens. A closure part 13 (or 23) may be assembled with the main body 11 (or 21), which pinches a resilient membrane 16 (or 26) between the part 13 (or 23) and the body 11 (or 21) around the opening of the latter. Furthermore, each closure part 13, 23 is provided with gas inlet means, in order to introduce a pressurised gas between this closure part and the corresponding membrane. These inlet means comprise an internal duct part 13a (or 23a) machined in the closure part 13 (or 23), an external pipe part 14 (or 24) and a system 15 (or 25) for connection to a pressurised gas supply (not shown). A recess 11a (or 21a) is made in the main body 11 (or 21) for passage of the external pipe part 14 (or 24). Each main body 11 (or 21) has a straight bore 12a (or 22a) around the opening 12 (or 22), which is designed to keep the closure part 13 (or 23) in a position centred with respect to the opening. It also includes a conical surface part 12b (or 22b) for guiding the deformation of the membrane 16 (or 26) via the opening. A curved connection surface 12c (or 22c) joins the bore 12a (or 22a) to the conical surface part 12b (or 22b). Finally, for each device 10 (or 20), the closure part 13 (or 23) is maintained clamped against the main body 11 (or 21) while pinching the membrane 16 (or 26) in a sealed manner, by screwed-down clamps 17 (or 27).

Figure 2C:
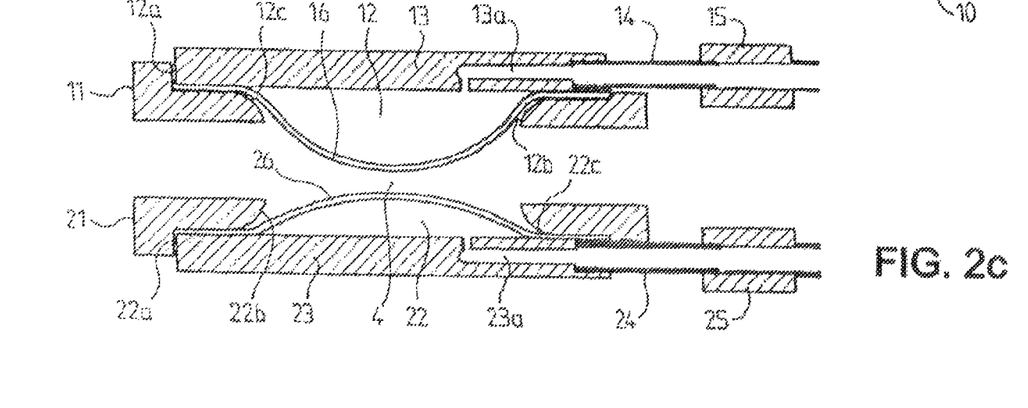
Figure 3A:
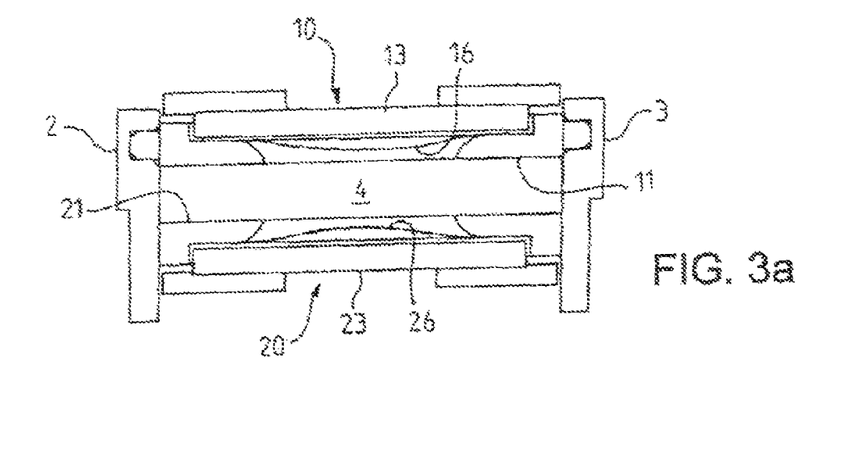

FIGS. 2c and 3a show the two devices 10 and 20 in the assembled position, when the membranes 16 and 36 are each partially inflated by gas pressure.

The step of pressing the multilayer structure 30 against the ophthalmic lens 40 will now be described with reference to FIGS. 3b-3f.

The device 10 is firstly removed and the support 31 bearing the multilayer structure 30 is placed on the membrane 26 of the device 20. The support 31 is oriented according to the direction N indicated in FIGS. 3b and 3c, that is to say in such a way that the support 31 is against the membrane 26 and the layer 36 faces upwards. When the structure 30 includes a film 37, this one is peeled off so as to expose the adhesive of the layer 36.

Figure 3B:
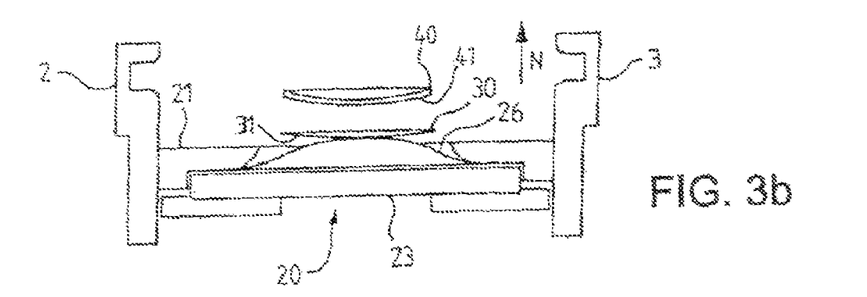
Figure 3C:
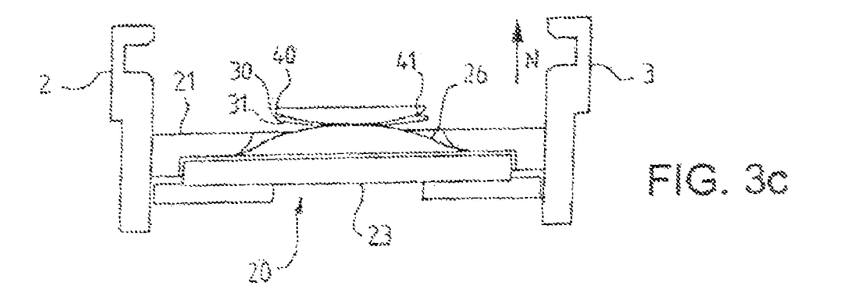

The lens 40 is then placed on the structure 30, with its convex face 41 turned towards the structure 30, in accordance with the complementary shapes of the support 31 and face 41 of the lens (FIGS. 3b and 3c).

Figure 3D:
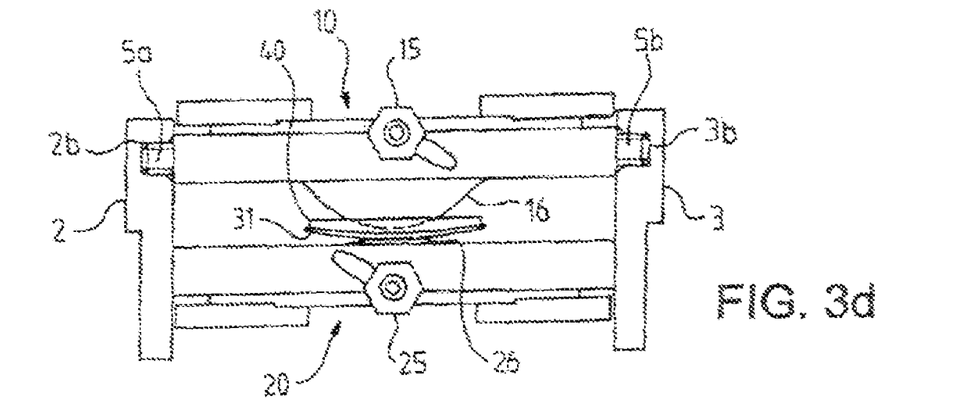
Figure 3E:
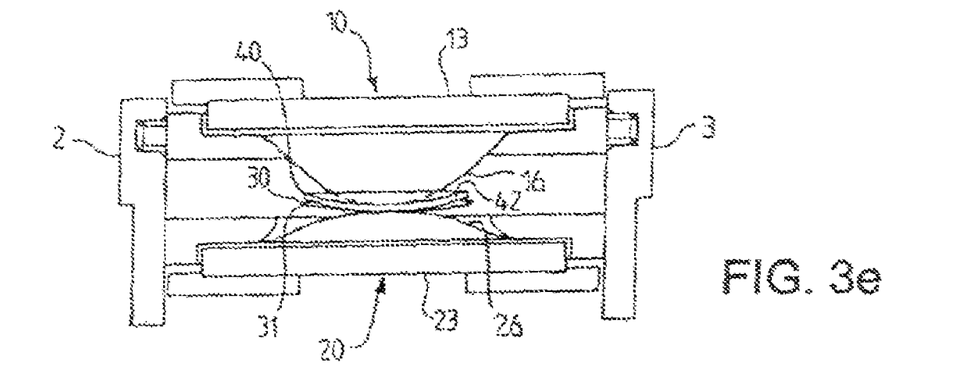

The device 10 is then assembled with the device 20, by engaging the rails 5a and 5b in the grooves 2b and 3b. The two membranes 16 and 26 are brought in this way so as to face each other, along the direction N, on either side of the lens 40 and of the structure 30 carried by the support 31. Next, a gas is introduced under pressure into the cavity lying between the closure part 13 and the membrane 16 of the device 10 until the membrane 16, upon being inflated, contacts with the concave posterior face 42 of the lens 40. FIG. 3d illustrates such a configuration, and FIG. 3e is a sectional view, corresponding to FIG. 3d, which clearly shows the inflated membrane 16.

Figure 3F:
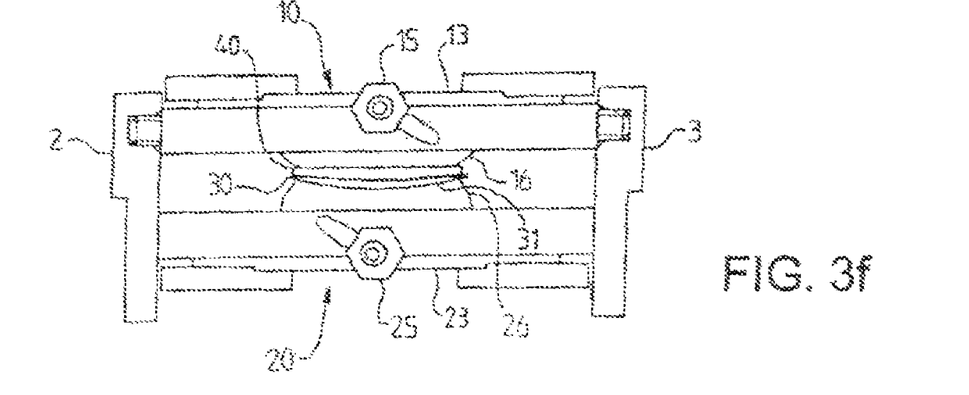

Finally, the gas pressure between the part 23 and the membrane 26 in the device 20 is made equal to that of the pressure between the part 13 and the membrane 16 in the device 10, the latter pressure being kept substantially constant. Such an operating mode prevents any displacements of the lens 40 and the support 31 carrying the structure 30. The membrane 26 is thus inflated against the support 31 and the membrane 16 serves as bearing surface for the glass 40. The pressure in the membrane 26 is increased until the latter is deformed so that it is applied against the entire surface of the support 31 (FIG. 3f). In this way, the pressure of the membrane 26 is transferred to the layer 36 at each point on the surface 41 of the lens. The structure 30 is thus uniformly applied onto the lens 40.

Optionally, the method may furthermore include the UV irradiation of the layer 36, carried out after the step of pressing the structure 30 against the lens 40, in order to harden the layer 36. Depending on the chemical composition of the adhesive of the layer 36, this irradiation may cure compounds contained in said layer, so that the layer 36 adheres definitively to the layer 35 on one side and to the lens 40 on the other side. Advantageously, at least one of the closure parts 13 and 23 and the corresponding membrane 16, 26 are transparent to the UV radiation. The irradiation may then be carried out through one of the pressing devices 10 or 20, when the structure 30 is still held firmly in place, clamped against the lens 40 by the membranes 16 and 26. Any risk of displacement of the structure 30 relative to the lens 40 is thus avoided.

This UV irradiation, or specific additional irradiation, may complete the curing of the layer 35, when this layer is undercured up to this stage in the process.

The gas pressure inside the devices 10 and 20 is then reduced, and the glass 40 is recovered. The structure 30 is then bonded to the face 41 of the lens via the layer 36.

The support 31 is then peeled off. During this peeling operation, the structure 30 remains fastened to the lens 40. The exposed surface of the structure 30 can then be washed, so as to remove any residues of the layer 32.

The functional layer 33 then lies on the opposite side of the layers 34 or 35 from the lens 40.

The inventors have found that such a method results in no reduction in the polarization contrast of the layer 35 compared with the initial value of this same contrast measured before the structure 30 is joined to the lens 40. In this way, highly polarizing lenses are obtained, which have a polarization contrast of 540 or higher and have an optical quality compatible with ophthalmic use.

It should be understood that many modifications may be introduced into the implementation of the invention that has been described in detail, for example so as to take account of a particular geometry of the optical element. In particular, the following modifications are possible, while still maintaining at least some of the advantages of the invention:

the bearing surface of the device 10 may be formed by a resilient cushion that replaces the inflatable membrane 16;

when the support 31 and the structure 30 are sufficiently resilient and capable of deforming plastically, the support 31 may be flat when it is introduced between the devices 10 and 20. It then deforms, conforming to the shape of the face 41 of the lens 40 when it is pressed against the latter by the two membranes 16 and 26;

the structure 30 may be applied in the same way to the concave face 42 of the lens 40, by turning the lens 40 over when introducing it between the pressing devices 10 and 20; and the adhesive layer 36 may be initially carried by the glass 40, or introduced between the devices 10 and 20 in the form of an independent portion of adhesive, that is to say one that is initially separate from both the structure 30 and the lens 40. It is placed between them and then compressed so as to form a uniform layer when the two membranes 16 and 26 are inflated.

The invention claimed is:

1. Method of producing a polarizing optical element by applying a multilayer structure to one surface of a base optical element, the structure comprising an orienting first layer and a polarizing second layer comprising liquid-crystal polymers and at least one dichroic dye, said dichroic dye having an angular orientation determined by the first layer, the method comprising the following steps:

a) producing the multilayer structure on a support;
   b) placing the base optical element and the multilayer structure carried by the support between a first pressing device having a bearing surface and a second pressing device having an inflatable membrane, the multilayer structure facing the base optical element and a portion of an adhesive being placed between said structure and said base element;
   c) pressing the multilayer structure against the surface of the base optical element by inflating the membrane of the second device and maintaining a fixed gap between the first and second pressing devices; and
   d) releasing the optical element and removing the support so as to leave the multilayer structure bonded to the surface of said base optical element,
   in which the first pressing device having the bearing surface includes another inflatable membrane, that forms said bearing surface, and in which step c) is carried out by inflating the membranes of the first and second pressing devices, and
   wherein said polarizing second layer is undercured during steps b) and c).

2. Method according to claim 1, which includes a step of supplementarily curing the polarizing second layer, carried out after step c).

3. Method according to claim 1, in which the first layer comprises a network of polymers photooriented along a defined direction, and in which the second layer comprises a matrix of monomeric liquid crystals, said matrix being oriented by the first layer and fixing the orientation of the dichroic compounds.

4. Method according to claim 3, in which step a) comprises the following substeps:

1) forming a first layer comprising photoorientable polymers on the support;
   2) curing the first layer using a linearly polarized ultraviolet radiation so as to produce a network of polymers photooriented along a direction imposed by the direction of polarization of said incident UV radiation;
   3) forming a second layer, comprising a mixture of at least one dichroic dye and at least one crosslinkable monomeric liquid crystal, on the first layer, said dye and said liquid crystal both being angularly oriented by the first layer; and
   4) curing the liquid-crystal compounds of the second layer at least partly so as to fix the dichroic compounds in the angular orientation determined by the first layer.

5. Method according to claim 1, in which the multilayer structure further includes at least a third layer selected from a UV radiation protection layer, an oxygen barrier layer, an abrasion-resistant layer, an impact-resistant layer, an antireflecting coating, an antistatic coating and an antisoiling coating, said third layer lying between the support on the one hand and said first and second layers on the other.

6. Method according to claim 1, in which the portion of adhesive is initially placed on the multilayer structure in the form of a layer lying on the opposite side of said first and second layers from the support.

7. Method according to claim 6, in which the adhesive layer is deposited on the multilayer structure by spin coating.

8. Method according to claim 1, in which the portion of adhesive is initially deposited in the form of a layer on the optical element on its face intended to receive the multilayer structure.

9. Method according to claim 8, in which the adhesive layer is deposited on the base optical element by spin-coating.

10. Method according to claim 1, which further includes irradiating the adhesive portion, after step c), in order to harden said portion.

11. Method according to claim 10, in which irradiating the adhesive portion is carried out between steps c) and d), through the first or second pressing device.

12. Method according to claim 1, in which a peeling layer is placed between the support and the multilayer structure.

13. Method according to claim 12, in which the peeling layer comprises a silicone-based surfactant compound.

14. Method according to claim 1, in which the support has a shape substantially complementary to the surface of the base optical element, when said support and said element are positioned for step b).

15. Method according to claim 1, in which the surface of the base optical element is convex.

16. Method according to claim 1, in which the base optical element comprises an ophthalmic lens.

17. Method according to claim 16, in which the ophthalmic lens has a refractive index of 1.60 or higher.

18. Method according to claim 1, in which, in step b), the base optical element is placed on the side of said first pressing device and the multilayer structure is placed on the side of said second pressing device.

19. Method according to claim 1, in which the bearing surface of the first pressing device comprises a resilient cushion.

* * * * *